United States Patent [19]

Ito

[11] 4,155,601

[45] May 22, 1979

[54] DISC BRAKE DEVICE FOR USE IN A VEHICLE

[75] Inventor: Sadayoshi Ito, Toyota, Japan

[73] Assignee: Toyota Jidosha Kogyo Kabushiki Kaisha, Aichi, Japan

[21] Appl. No.: 841,487

[22] Filed: Oct. 12, 1977

[30] Foreign Application Priority Data

Apr. 5, 1977 [JP] Japan .............................. 52-41595[U]

[51] Int. Cl.$^2$ ................................................ B60B 7/02
[52] U.S. Cl. ................................ 301/6 E; 301/6 WB;
301/37 R; 301/123; 188/218 XL
[58] Field of Search .......... 301/6 R, 6 E, 6 A, 6 WB, 301/123, 37 R, 37 S; 308/36.4, 187.1; 188/218 A, 218 XL, 18 A, 71.1

[56] References Cited

U.S. PATENT DOCUMENTS

| | | | |
|---|---|---|---|
| 1,995,691 | 3/1935 | Stough et al. ..................... | 188/218 A |
| 2,762,458 | 9/1956 | Goepfrich et al. ........... | 188/218 A X |
| 3,476,224 | 11/1969 | Buching ......................... | 188/218 XL |
| 4,005,768 | 2/1977 | Bubnash et al. ................. | 188/218 A |

FOREIGN PATENT DOCUMENTS

| | | | |
|---|---|---|---|
| 746877 | 12/1944 | Fed. Rep. of Germany ...... | 188/218 A |
| 1004299 | 9/1965 | United Kingdom .................. | 188/18 A |

*Primary Examiner*—Robert J. Spar
*Assistant Examiner*—Charles A. Marmor
*Attorney, Agent, or Firm*—Stevens, Davis, Miller & Mosher

[57] ABSTRACT

A disc brake device for use in a vehicle which comprises a disc rotor having annular disc brake surfaces, a wheel hub for supporting the disc rotor and being rotatably supported by a wheel axle via bearings, a stationary dust cover for covering both an outer surface of the disc rotor and an end surface of the wheel hub, and a mudguard cover which is fixed to the dust cover and which has a peripheral edge portion extending to a position adjacent to the surface of the disc rotor. This disc brake device can prevent muddy water from entering into the inside thereof, thereby preventing the lips of a seal and one of the bearings mounted in the device from being damaged by external muddy water. In addition, the lubricating oil for the bearing can be prevented from degradation by such muddy water.

6 Claims, 4 Drawing Figures

DISC BRAKE DEVICE FOR USE IN A VEHICLE

BRIEF DESCRIPTION OF THE INVENTION

This invention relates to a disc brake device for use in a vehicle.

It is well known that a disc brake device of a vehicle comprises a wheel hub rotatably supported by bearings, a disc rotor fixed to the wheel hub and a caliper having a pair of rubbing pads for clamping down the disc rotor between the rubbing pads.

It is also well known that such a disc brake device further comprises a stationary dust cover disposed at a position facing to the outer surface of the disc rotor, and being exposed to the roadway. This particular construction is designed for the purpose of preventing dust and muddy water from entering into both the braking portion, which comprises the rubbing pads and the disc rotor, and the inside of the wheel hub.

In practice, the above-mentioned construction is effective as a device for keeping the braking portion and the inside of the wheel hub free from muddy water only if the amount of muddy water involved is small. Therefore, the above-mentioned construction is not sufficient for preventing muddy water from entering into both the braking portion and the inside of the wheel hub when an excessive amount of muddy water is involved. This problem is caused by the fact that the disc brake device not only necessarily has a clearance for ensuring a sufficient space for installation of the caliper within the stationary dust cover but also a clearance for permitting the disc rotor to rotate in a condition which is free from contact with the stationary dust cover.

The lips of a seal are usually disposed at a position between the wheel hub and one of the bearings for rotatably supporting the wheel hub on a wheel axle in order to prevent muddy water from entering into the bearing. However, as mentioned above, if an excessive amount of muddy water is present, the muddy water cannot be stopped from entering into the insides of the wheel hub and from damaging the lips. In this case, the muddy water will be able to pass by the damaged lips thus reaching the bearing with ease. As a result, the bearing is seriously damaged. In addition, when muddy water enters into the insides of the wheel hub and becomes admixed with the grease which is stored at a position rearward of the bearing, the grease becomes degraded and causes the bearing to be easily damaged. Accordingly, a damaged bearing creates a very dangerous driving condition when the vehicle is running. Therefore, it is absolutely necessary to prevent muddy water from entering into the bearing in order to keep the bearing free from the above-mentioned damage.

SUMMARY OF THE INVENTION

A principal object of the present invention is to provide a disc brake device for a vehicle which can prevent muddy water from entering therein.

Another object of the present invention is to provide a disc brake device for a vehicle which has a specially designed mud-guard cover. As a result, the disc brake device can effectively prevent muddy water from entering therein.

The above-mentioned objects and other further objects, as well as novel features, of the present invention will become more fully apparent from the detailed description of the invention, set forth below, with reference to the accompanying drawings. It is to be understood, however, that the drawings are only for the purpose of illustration and not intended for restricting the scope of the invention.

DETAILED DESCRIPTION OF THE INVENTION

Figure 1:
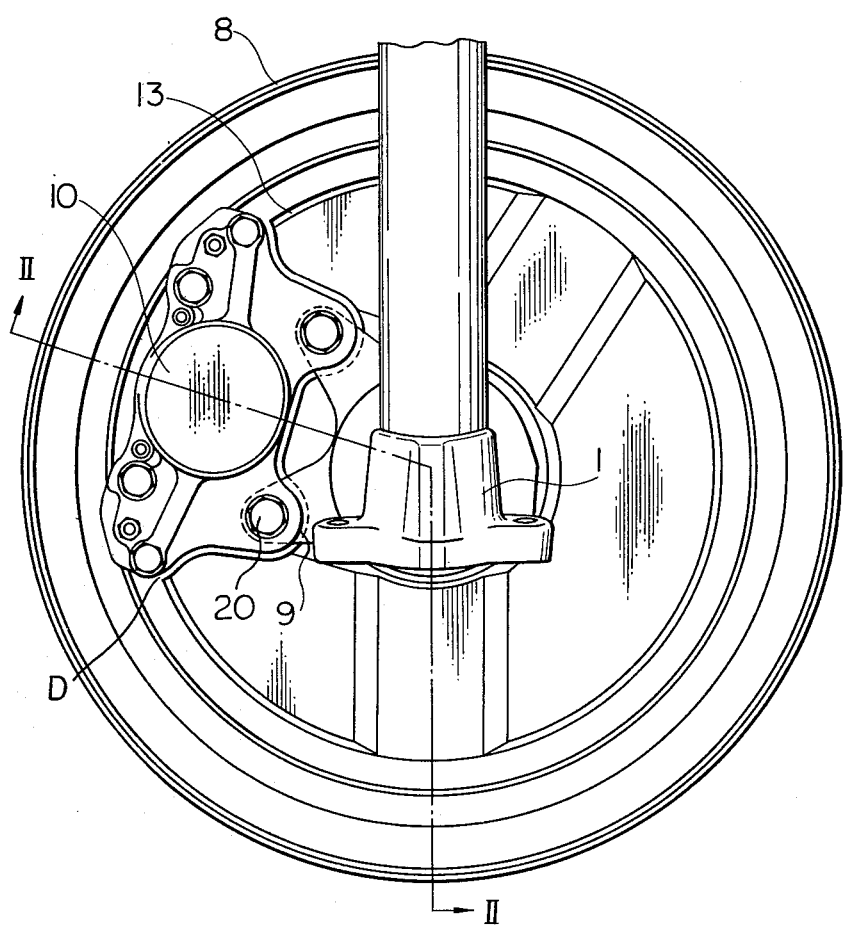
FIG. 1 is an elevational view of an embodiment according to the present invention.

A disc brake device according to the present invention is explained hereinafter with reference to the accompanying FIGS. 1 and 2, in which a front wheel of a vehicle is illustrated. In the figures, the front wheel comprises a steering knuckle 1, a wheel axle 2 (in FIG. 2) fixed to the steering knuckle 1, a wheel hub 4 rotatably mounted on the wheel axle 2 via roller bearings 3 and 3', a disc rotor 6 fixed to the wheel hub 4 by means of bolts 5, a disc wheel 8 fixed to the wheel hub 4 by means of bolts 7 and nuts 7', a caliper support 9 fixed to the steering knuckle 1 by means of bolts 20, and a caliper 10 fixed to the caliper support 9. The caliper 10 has a pair of pistons 11 and 11' each of which moves oppositely to the other. Each of the pistons 11 and 11' is fixed at an end thereof with a rubbing pad 12 and 12', respectively. The braking operation of the wheel (not shown) is effected by clamping down the disc rotor 6 between the rubbing pads 12 and 12'. A stationary dust cover 13 is fixed onto a flange surface 1a of the steering knuckle 1 so that the stationary dust cover 13 faces and covers an outer surface 6a of the disc rotor 6. The outer surface 6a is located opposite to the disc wheel 8 and is exposed to the roadway (not shown). This stationary dust cover 13 serves to prevent dust from sticking onto the surface of the disc rotor 6. In addition, an internal edge portion 13a of the stationary dust cover 13 is disposed in the proximity of an annular groove 4a formed on the outer surface of the wheel hub 4 so as to form a small clearance between the internal edge portion 13a and the annular groove 4a. A seal 14 made of an elastic material such as rubber is forcedly fitted into the wheel hub 4 at a position in front of the bearing 3. The seal 14 is provided with a lip 14a for preventing muddy water from entering into the inside of the wheel hub 4 and with another lip 14b for preventing grease from leaking out from the inside of the wheel hub. A grease chamber 15 for storing lubricating grease of the bearings 3 and 3' is formed in a hollow space located between the wheel axle 2 and the wheel hub 4. As shown in FIG. 2, the disc rotor 6 has an annular dent 6b located between an inner portion of the disc rotor 6 to which the wheel hub is fixed and a peripheral portion of the disc rotor 6 extending to the disc brake surfaces where the rubbing pads 12 and 12' clamp down. Within the annular dent 6b, a small space S is formed. The annular dent 6b is formed so as to facilitate easy installation of the disc rotor 6 to the wheel hub 4 and so as to strengthen the disc rotor 6.

The above-mentioned construction of the disc brake device is the same as that of the conventional disc brake device. A part of the muddy water enters from the outside of the disc rotor 6 through a space located between the outer surface 6a of the disc rotor 6 and the stationary dust cover 13 as shown with an arrow A in FIG. 2, and another part of the muddy water enters from the clearance D (please see FIG. 1) located between the caliper support 9 and the dust cover 13 as shown with an arrow B in FIG. 2. Although only a part of the muddy water may be prevented from entering into the inside of the disc brake device by the internal edge portion 13a of the dust cover 13 and the annular groove 4a of the wheel hub 4, another part of the muddy water can pass by the internal edge portion 13a and the annular groove 4a and can reach the seal 14 when the total amount of the muddy water is large. Furthermore, the muddy water can pass by the seal 14 and enter into the grease chamber 15 through the roller bearing 3.

If the muddy water does enter into the inside of the wheel hub 4 as described above, the lips 14a and 14b of the seal 14 are surely to be damaged; therefore, the effectiveness of the lips 14a and 14b for preventing the grease from leaking out will be increasingly lowered as more water enters in and the grease will eventually be degraded. This condition causes the roller bearing 3 to be damaged at its early stages.

To prevent the occurrences of the above-mentioned damages, the present invention provides a mud-guard cover 16, positioned within the small space S formed between the disc rotor 6 and the wheel hub 4. This mud-guard cover 16 is fastened to the dust cover 13 by means of bolts or spot welding (neither is shown). As shown in FIG. 3, the mud-guard cover 16 comprises an annular flat portion 16a which is positioned to face the stationary dust cover 13 (see FIG. 2) and a frusto-conical peripheral edge portion 16b extending from the annular flat portion 16a. As shown in FIG. 2, the mud-guard cover is arranged so that an end 16c of the frusto-conical peripheral edge portion 16b is situated in the proximity of the outer surface 6a (see FIG. 2) of the disc rotor 6 in the annular dent 6b (see FIG. 2). In addition, the frusto-conical peripheral edge portion 16b has a stepped portion 16e in an intermediate portion thereof adjacent the radially outermost end thereof, and the annular flat portion 16a has three holes 16d for bolts (not shown) to be inserted therein which are used for fastening the mud-guard cover 16 to the dust cover 13.

The disc brake device according to the present invention temporarily stores the muddy water (which enters from the clearance located between the disc rotor 6 and the stationary dust cover 13 or which enters from the clearance located between the caliper support 9 and the stationary dust cover 13) in a space formed by the disc rotor 6 and the dust cover 13 to prevent the muddy water from entering into the bearing 3. As the disc rotor 6 rotates, the temporarily stored muddy water moves downward and is discharged to the outside of the disc brake device due to its liquid weight. Accordingly, the muddy water is prevented from entering into the small clearance located between the internal edge portion 13a and the annular groove 4a, the seal 14, the roller bearing 3 and the grease chamber 15; as a result of which, the seal 14 and the roller bearing 3 are not damaged and the grease is not degraded.

It is preferable that the clearance C shown in FIG. 2 formed between the radially outermost radially outwardly extending end 16c of the mud-guard cover 16 and the disc rotor 6 be made as small as possible as long as the normal rotation of the disc rotor 6 is not interfered with.

Because the stepped portion 16e, which is formed on the edge portion 16b of the mud-guard cover 16 as shown in FIGS. 2 and 3, increases the amount of the temporarily stored muddy water, the muddy water removing property of the mud-guard cover 16 is therefore improved and its degree of efficiency for preventing muddy water from entering into the bearing is also increased. The stepped portion 16e formed on the edge portion 16b also strengthens the mud-guard cover 16, because the stepped portion 16e forms a rib on the edge portion 16b. In addition, since the mud-guard cover 16 is usually manufactured by a press, because the portion 16e is formed in a stepped formation on the edge portion 16b, the degree of drawing in one press action is decreased. Therefore, the pressing operation during the manufacturing of the mud-guard cover 16 becomes easy and the pressing operability becomes increased.

It is also preferable that the stepped portion 16e of the mud-guard cover 16 be situated at a position on a prolongation of a concave conical surface 6c formed at a position between the outer surface 6a and the annular dent 6b of the disc rotor 6. This causes a phenomenon wherein muddy water entering along the concave conical surface 6c and reaching the stepped portion 16e of the mud-guard cover 16 flows in a direction opposite to the end 16c of the mud-guard cover 16, therefore, preventing the muddy water from entering into the seal 14.

Figure 2:
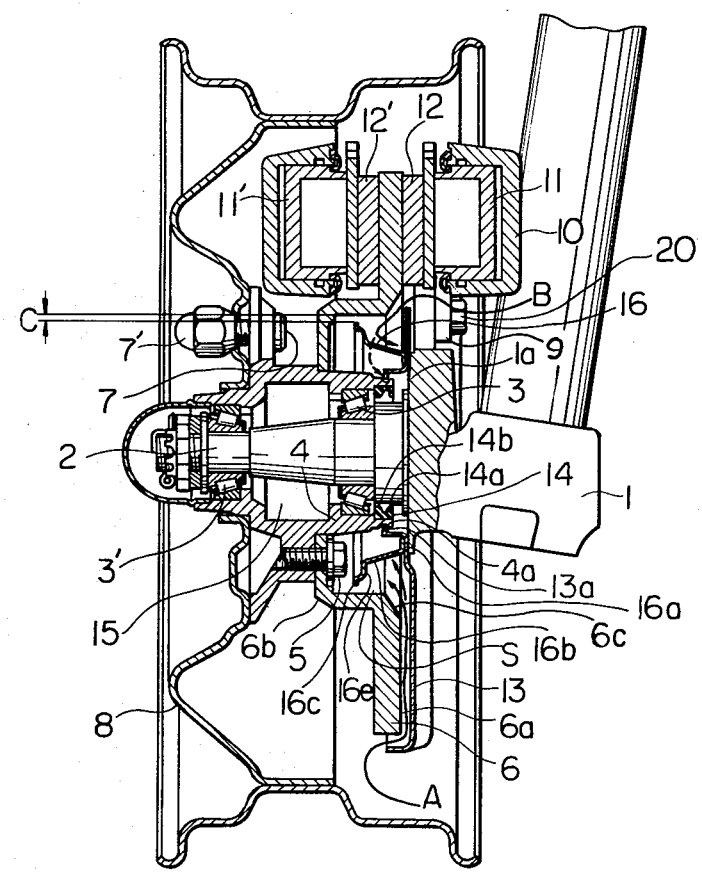
FIG. 2 is a cross-sectional view along line II—II shown in FIG. 1.
Figure 3:
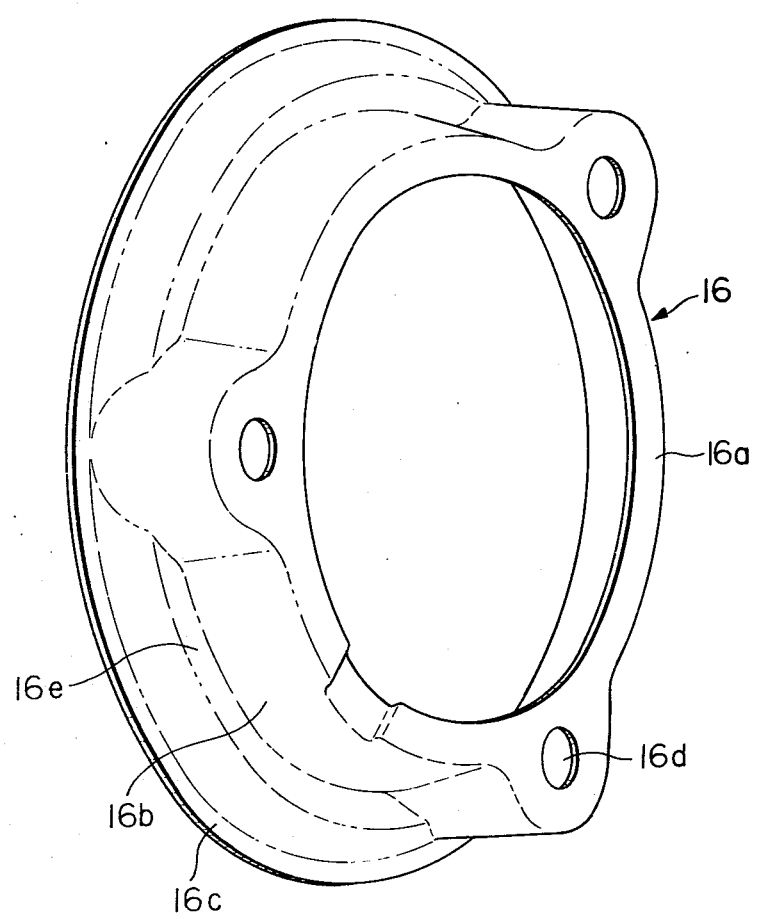
FIG. 3 is a perspective view of the mud-guard cover shown in FIG. 1.
Figure 4:
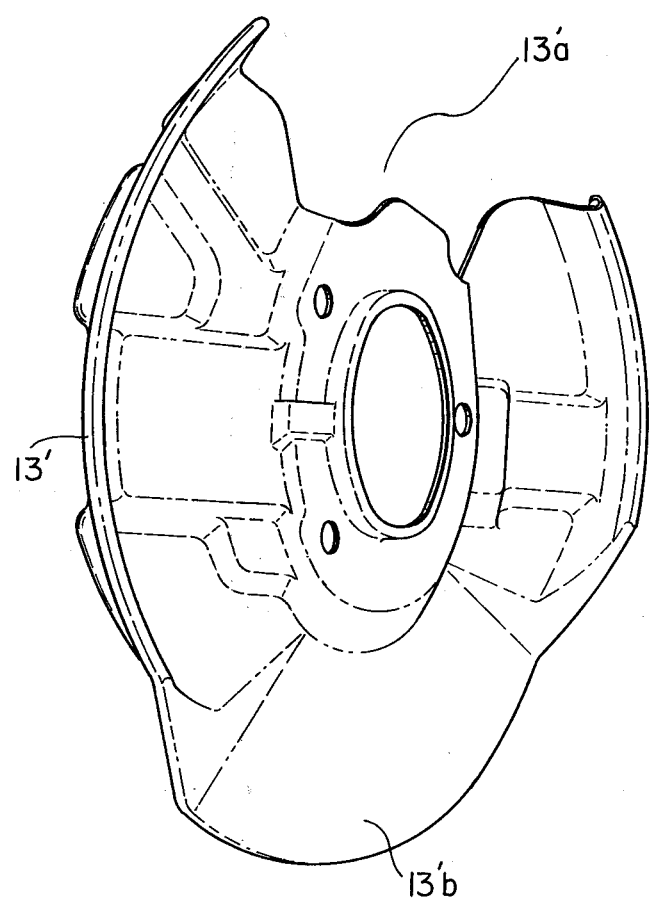
FIG. 4 is a perspective view of another stationary dust cover.

The present invention can be effectively utilized not only with a disc brake device having a stationary dust cover as shown in FIGS. 1 and 2, but also with a disc brake device having another stationary dust cover such as that shown in FIG. 4, which is designated with a reference numeral 13'. The stationary dust cover 13' shown in FIG. 4 has an outwardly spread-out portion 13'b at a position opposite to an opening 13'a for positioning the caliper 10 so that cooling air can enter along the spread-out portion 13'b for cooling the disc rotor 6. When the disc rotor 6 is clamped down with the rubbing pads 12 and 12', the temperature of the disc rotor may become very high. In that event, the coefficient of friction between the rubbing pads 12, 12' and the disc rotor 6 may be lowered, and the temperature of the working oil for actuating the rubbing pads 12, 12' may reach the boiling point of the oil. The outwardly spread-out portion 13'b is provided so as to prevent the lowering of the coefficient of friction and the boiling of the working oil. However, the outwardly spread-out portion 13'b causes the disc brake device to be exposed to the danger of muddy water entering into the inside of the disc brake device. By utilizing the present invention, muddy water can be prevented from entering into the disc brake device because of the stationary dust cover with an outwardly spread-out portion being provided therein.

As mentioned above, because muddy water can be prevented from entering into the disc brake device according to the present invention, the lips of the seal and the bearing can therefore be prevented from being damaged and the grease can also be prevented from being degraded. Consequently, the bearing can be prevented from being damaged at its early stages.

What we claim is:

1. A disc brake device of a vehicle comprising:
    a disc rotor having annular disc brake surfaces provided at peripheral portions of opposing outer surfaces thereof;
    a wheel hub having said disc rotor mounted thereon and being supported by bearings mounted on a wheel axle formed in one body with a knuckle flange;

a dust cover for covering an axially inner one of the outer surfaces of said disc rotor and an end surface of said wheel hub, said dust cover being fixed to a side surface of said knuckle flange;

a mud-guard cover having a peripheral edge portion extending to a position adjacent to said disc rotor, said mud-guard cover being fixed to said dust cover;

said disc rotor has an annular dent located between a radially inner portion of said disc rotor to which said wheel hub is fixed and the peripheral portions of said disc rotor, said mud-guard cover being within said annular dent;

said mud-guard cover has an annular flat portion which faces said dust cover and a frusto-conical peripheral edge portion which extends from said annular flat portion;

said mud-guard cover has a stepped portion in said frusto-conical peripheral edge portion; and said disc rotor has a frusto-conical surface at a position between said annular dent of said disc rotor and said one outer surface of said disc rotor, and said stepped portion of said mud-guard is adjacent the radially inner end of said frusto-conical surface.

2. A disc brake device of a vehicle comprising:

a disc rotor having annular disc brake surfaces provided at peripheral portions of opposing outer surfaces thereof;

a wheel hub having said disc rotor mounted thereon and being supported by bearings mounted on a wheel axle formed in one body with a knuckle flange;

a dust cover for covering an axially inner one of the outer surfaces of said disc rotor and an end surface of said wheel hub, said dust cover being fixed to a side surface of said knuckle flange;

a mud-guard cover having a peripheral edge portion extending to a position adjacent to said disc rotor, said mud-guard cover being fixed to said dust cover; and said mud-guard cover has an annular flat portion which faces said dust cover and a frusto-conical peripheral edge portion which extends radially outwardly from said annular flat portion, and said mud-guard cover has a stepped portion in an intermediate portion of said frusto-conical peripheral edge portion adjacent the radially outermost end thereof.

3. A disc brake device as claimed in claim 2, wherein:

the frusto-conical peripheral edge portion of said mud-guard cover has a radially outermost radially outwardly extending end.

4. A disc brake device of a vehicle comprising:

a disc rotor having an annular radially innermost radially outwardly extending portion, an intermediate axially inwardly extending portion extending from the radially outer end of the innermost portion, an annular radially outermost portion extending radially outwardly from the axially inner end of the intermediate portion, said outermost portion having opposing axially inwardly and axially outwardly facing disc brake surfaces, and a frusto-conical surface portion at the axially inner end of the intermediate portion and the radially inner end of the radially outermost portion;

a wheel hub having said disc rotor mounted thereon and being supported by bearings mounted on a wheel axle formed in one body with a knuckle flange, said hub and said innermost and intermediate portions of said rotor defining a space therebetween;

a dust cover for covering the axially inner surface of the disc rotor and an end surface of the wheel hub, said dust cover being fixedly secured to said knuckle flange and having a radially inner end adjacent said hub;

a mud-guard cover secured to the dust cover adjacent the radially inner end thereof and extending axially outwardly and radially outwardly therefrom into said space, said mud-guard cover comprising:

a radially innermost annular flat portion fixedly secured to said dust cover adjacent the radially inner end thereof;

a frusto-conical portion extending axially outwardly and radially outwardly from the radially outer end of the flat portion; and a radially outwardly extending stepped portion intermediate the radially inner and outer ends of the frusto-conical portion adjacent the radially outer end thereof, said stepped portion being adjacent the radially inner end of the concave surface portion of the rotor.

5. A disc brake device of a vehicle comprising:

a disc rotor having an annular radially innermost radially outwardly extending portion, an intermediate axially inwardly extending portion extending from the radially outer end of the innermost portion, and an annular radially outermost portion extending radially outwardly from the axially inner end of the intermediate portion, said outermost portion having opposing axially inwardly and axially outwardly facing disc brake surfaces;

a wheel hub having said disc rotor mounted thereon and being supported by bearings mounted on a wheel axle formed in one body with a knuckle flange, said hub and said innermost and intermediate portions of said rotor defining a space therebetween;

a dust cover for covering the axially inner surface of the disc rotor and an end surface of the wheel hub, said dust cover being fixedly secured to said knuckle flange and having a radially inner end adjacent said hub;

a mud-guard cover secured to the dust cover adjacent the radially inner end thereof and extending axially outwardly and radially outwardly therefrom into said space, said mud-guard cover comprising:

a radially innermost radially outwardly extending annular portion fixedly secured to said dust cover adjacent the radially inner end thereof;

a frusto-conical portion extending axially outwardly and radially outwardly from the radially outer end of the flat portion; and a radially outwardly extending stepped portion intermediate the radially inner and outer ends of the frusto-conical portion adjacent the radially outer end thereof, said stepped portion being adjacent the intermediate portion of the disc rotor.

6. A disc brake device of a vehicle comprising:

a disc rotor having an annular radially innermost radially outwardly extending portion, an intermediate axially inwardly extending portion extending from the radially outer end of the innermost portion, and an annular radially outermost portion extending radially outwardly from the axially inner end of the intermediate portion, said outermost portion having opposing axially inwardly and axially outwardly facing disc brake surfaces;

a wheel hub having said disc rotor mounted thereon and being supported by bearings mounted on a wheel axle formed in one body with a knuckle flange, said hub and said innermost and intermediate portions of said rotor defining a space therebetween;

a dust cover for covering the axially inner surface of the disc rotor and an end surface of the wheel hub, said dust cover being fixedly secured to said knuckle flange and having a radially inner end adjacent said hub;

a mud-guard cover secured to the dust cover adjacent the radially inner end thereof and extending axially outwardly and radially outwardly therefrom into said space, said mud-guard cover comprising:

a radially innermost radially outwardly extending annular portion fixedly secured to said dust cover adjacent the radially inner end thereof;

a frusto-conical portion extending axially outwardly and radially outwardly from the radially outer end of the flat portion, said frusto-conical portion terminating in a radially outermost radially outwardly extending end; and a radially outwardly extending stepped portion intermediate the radially inner and outer ends of the frusto-conical portion adjacent the radially outer end thereof, said stepped portion being adjacent the intermediate portion of the disc rotor.

* * * * *